//

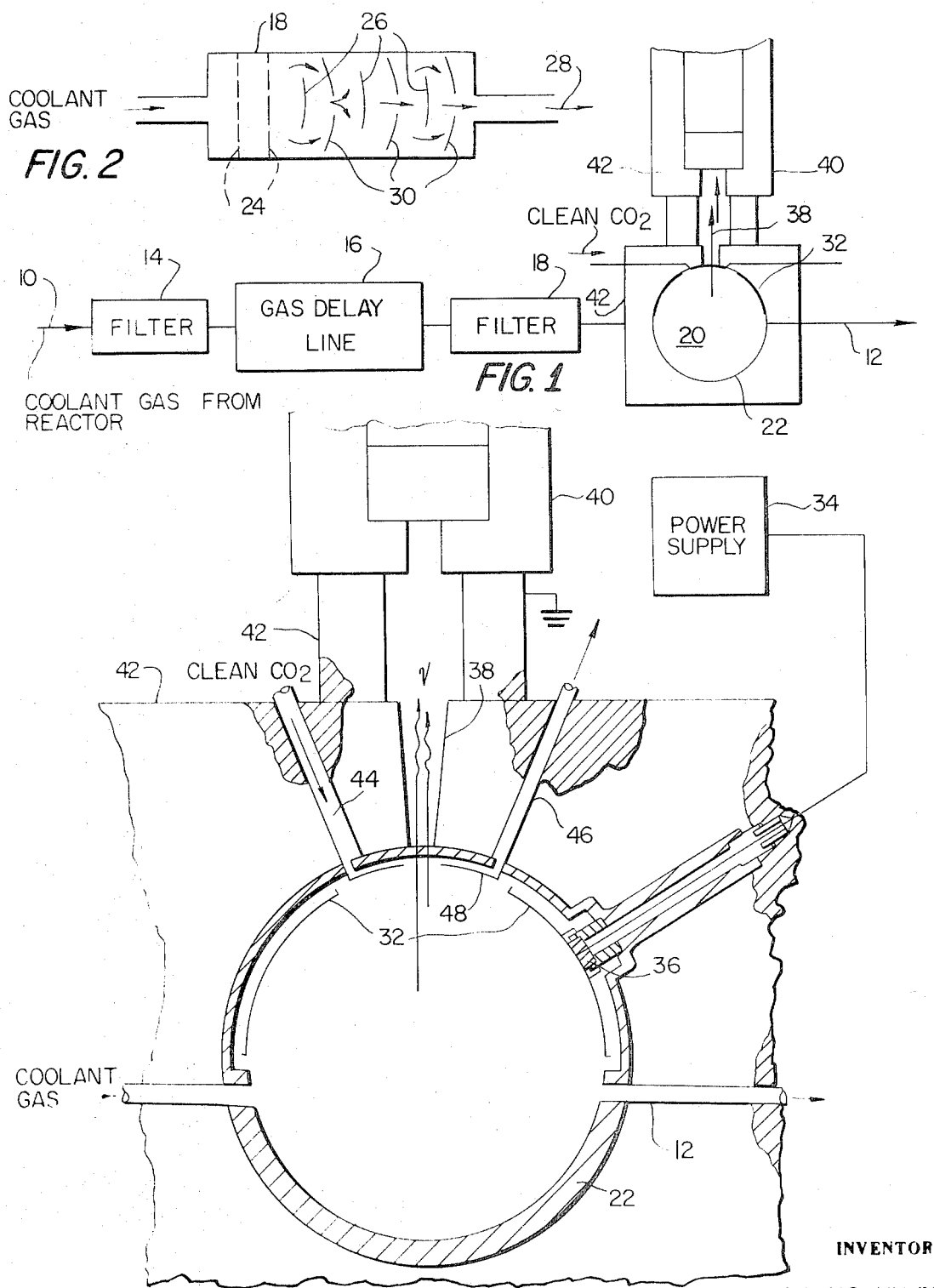

United States Patent Office 3,788,942
Patented Jan. 29, 1974

3,788,942
BURST CARTRIDGE DETECTION SYSTEM FOR USE WITH GAS-COOLED REACTORS
Kyung Ho Hyun, Seoul, Korea, assignor to Korea Institute of Science & Technology, Seoul, Korea
Filed Sept. 29, 1970, Ser. No. 76,497
Claims priority, application Korea, Oct. 14, 1969, 1,341
Int. Cl. G21c 17/04
U.S. Cl. 176—19 LD          9 Claims

ABSTRACT OF THE DISCLOSURE

A burst cartridge detection system for use with gas-cooled power reactors includes a pressure vessel having a sampling chamber with an electrode positioned within the chamber for preventing the build-up of daughter products within the chamber. Two filters and a delay line are in fluid communication with the chamber, and a collimator connects a scintillation detector with the chamber whereby predetermined types of radiation within the coolant gas, such as gammas from fission products within the reactor, are detected.

---

This invention relates to the detection of impurities within gases and more particularly to a burst cartridge detection system for use in a coolant gas circuit of a gas-cooled reactor whereby gammas in the cooling gas from fission products within the reactor are detected.

Precipitator units have been and are presently used for burst cartridge detection. Such precipitator units are equipped with a precipitation chamber and a separate scintillation counter. A tungsten wire carries active isotopes, such as those of rubidium and cesium, adhered thereto from the chamber to the counter. Although such precipitation units have served the purpose, they utilize moving parts, and as a result, installation and maintenance costs are relatively high. One way in which the high operating and installation costs of these precipitator units has been avoided has been the use of a direct measurement method in burst cartridge detection. However, even this method of directly measuring the fission product activities has resulted in a gradual build-up of background in the sampling chamber due to contamination of the sampling chamber wall by daughter products.

It is, therefore, an object of the present invention to enable the efficient and accurate detection by direct measurement of the fission product activities of a reactor without the use of moving parts and without a gradual build-up of background due to contamination of the sampling chamber wall by daughter products.

To achieve this and other objects the present invention provides a pressure vessel having a sampling chamber in fluid communication with the coolant gas circuit of the reactor. Electrode means are positioned within the chamber for preventing a build-up of daughter products within the chamber, and a collimator is provided adjacent to the chamber for receiving predtermined types of radiation from the coolant gas and from the chamber. Means are also provided in operative relationship with the chamber via the collimator for detecting the predetermined types of radiation within the coolant gas, and means are located adjacent to the collimator and between the chamber and the detecting means for passing a continuous flow gas, substantially free of the predetermined types of radiation, across the collimator.

Preferably, the burst cartridge detection system includes a shield between the detecting means and the electrode means and further includes an electrical insulator positioned to insulate the electrode means from the pressure vessel. The detection system also preferably includes a power supply in circuit with the electrode means for negatively charging the electrode means whereby positively charged daughter products in the coolant gas are collected by the electrode means.

Additional objects and advantages of the invention will be set forth in part in the description which follows and in part will be obvious from the description or may be learned by practice of the invention. The objects and advantages are realized and obtained by means of the instrumentalities and combinations particularly pointed out in the appended claims.

In the drawings:
FIG. 1 is a diagrammatic representation of the burst cartridge detection system of this invention;
FIG. 2 is a more detailed diagrammatic view of a filter element within the system; and
FIG. 3 is a detailed diagrammatic view of a portion of the system illustrated in FIG. 1.

With reference now to the drawings, wherein like reference characters designate like or corresponding parts throughout the several views, there is shown in FIG. 1 the burst cartridge detection system of this invention. Coolant gas, such as carbon dioxide, enters the detection system from the reactor (not shown) via line 10 and exits the detection system via line 12. A first filter 14 is located in fluid communication with the coolant gas and with line 10. A delay line 16 is located in fluid communication with first filter 14 for delaying the flow of the coolant gas for two or three minutes in order to reduce the important gas activities of $N^{16}$ and $A^{41}$ to a negligible level. A delay of two or three minutes is sufficient because the half-lives of $N^{16}$ and $A^{41}$ are 7.36 seconds and 29.4 seconds, respectively.

A second filter 18 is located in fluid communication with delay line 16 and with a sampling chamber 20 formed by a pressure vessel 22. The second filter is shown in more detail in FIG. 2 and includes two filter plates 24 and a series of alternately placed negative electrodes and baffles. A plurality of negatively charged electrodes 26 are spaced apart along the primary direction of flow 28 of the coolant gas, and a plurality of baffles 30 are spaced apart along the primary direction of flow of the coolant gas and are alternately spaced between electrodes 26.

In accordance with the invention, electrode means are positioned within the sampling chamber for preventing the build-up of daughter products within the chamber. As here embodied the electrode means is electrode 32. This electrode is preferably shaped in a substantially hemispherical configuration, and a power supply 34 is provided in circuit with the electrode for negatively charging the electrode. In addition, the electrode is insulated from pressure vessel 22 by means of electrical insulator 36, which is positioned between the pressure vessel and the electrode.

A collimator 38 is provided adjacent sampling chamber 20 for receiving predetermined types of radiation, such as gammas from fission products within the reactor, from the coolant gas within the chamber, and means are provided in operative relationship with the chamber via the collimator for detecting these radiations. As here embodied, the detecting means is a scintillation detector 40, and a relatively heavy lead shield or castle 42 is positioned to insulate detector 40 from electrode 32.

Pressure vessel 22 and sampling chamber 20 are preferably spherical in shape, and the pressure vessel is preferably comprised of stainless steel.

In accordance with the invention, means are located adjacent to the collimator and between the chamber and the detecting means for passing a continuous flow of gas, substantially free of the predetermined types of radiation across the collimator. As here embodied, the passing means include inlet conduit 44 and outlet conduit 46 coupled together by conduit 48. A supply of so-called clean gas, such as carbon dioxide free of the predetermined types of radiation is caused to pass through conduits 44, 48, and 46, respectively, so that the area around collimator 38 is washed with a continuous flow of carbon dioxide which is substantially free of the undesirable impurities. The area around the collimator 38 is also maintained near or at ground potential.

In operation of the burst cartridge detection system, coolant gas from the reactor (not shown) is diverted from the primary coolant gas circuit (not shown) so that a sample of the gas enters the detection system via line 10. The coolant gas initially passes through filter 14, which is used for removing any particles in the gas sample that are larger than a half micron. In addition, most of the spalled oxides, such as Fe, Mn, and Co from the reactor core are removed by filter 14.

The coolant gas sample then passes through delay line 16 which delays the gas flow for two or three minutes. By delaying the gas flow it is possible to reduce the important gas activities of $N^{16}$ and $A^{41}$ to a negligible level since the half-lives are very short (7.36 seconds and 29.4 seconds, respectively).

The coolant gas emerges from delay line 16 and enters second filter 18 which includes two filter plates 24, negatively charged electrodes 26 and baffles 30. Electrodes 26 and baffles 30 act to stop substantially all particles other than gaseous particles and those filtered out by first filter 14. Negatively charged electrodes 26 collect all positive ions except gaseous ions, and baffles 30 stop a large portion of neutral isotopes.

The coolant gas sample emerges from filter 18 and passes into sampling chamber 20 within pressure vessel 22. The chamber is spherical in shape to provide a minimum surface area for a fixed volume, and negatively charged electrode 32 is positioned within the chamber to collect positive daughter products located within the coolant gas sample. The electrode is insulated from vessel 22 by insulator 36, which may be an alumina insulator for example, and detector 40 is shielded from electrode 32 by a heavy lead shield or castle 42 so that the accuracy of the detector is not affected by the charge on electrode 32. Furthermore, the area around collimator 38 is maintained at substantially ground potential and is washed with a continuous flow of carbon dioxide gas which is free of undesirable impurities.

Thus, with the particles in the coolant gas sample removed and with the positively charged daughter products removed therefrom by electrode 32, the gammas in the gas sample from fission products within the reactor are detected by scintillation detector 40. This system, therefore, eliminates the high cost involved with moving parts that are required in prior art systems, and the gradual build-up of background due to contamination of the chamber wall by daughter products is eliminated. Because a major portion of the daughter products are removed from the chamber, the activities of fission products within the coolant gas sample can be measured directly and accurately.

CALCULATION RESULTS FOR GERMAN KKN-REACTOR

Design calculation is carried out for a German KKN-Reactor B. C. D. system as an example. The basic data for calculation are listed in the table below:

Table: Data for KKN-Reactor (1) Neutron flux density (thermal): $5 \times 10^{13}$ ncm$^{-2}$ sec.$^{-1}$
(2) Coolant: carbon dioxide:
    (1) Coolant pressure: 60 atm. (882 p.s.i.a.)
    (2) Massflow rate in core: 1500 ton/hr. ($4.233 \times 10^5$ g./sec.)
    (3) $CO_2$ density: 1.977 g./litre at N.P.T.
    (4) Total mass of coolant: 10.8 tone ($1.079 \times 10^7$ grams)
    (5) Impurities in coolant:
        Argon: 0.5 p.p.m.
        Oxygen: 2.0 p.p.m.
        Nitrogen: 10–15 p.p.m.
        Boron: 0.01 p.p.m.
        Hydrogen: 1.0 p.p.m.
        Water: 5–15 p.p.m.
        CO: 3 g./kg.
        $CH_4$: $10^3$ p.p.m.
    (6) Activity due to $N^{16}$: 0.17 curie/m.$^3$
(3) Time for one complete circulation: 13 seconds
(4) Time in the core: 0.2 second
(5) Amount of fuel surface contamination: $6.26 \times 10^{-2}$ gram of natural uranium.

The following three examples of operation are considered:

Example 1.—The system of FIG. 1 wherein the sampling chamber has no electrode.
Example 2.—The system of FIG. 1 wherein the sampling chamber has polarizing electrode 32.
Example 3.—The system of FIG. 1 wherein the sampling chamber has polarizing electrode 32 but the series of negative electrodes 26 in the second filter 18 are replaced by baffles similar to baffle 30.

Assuming that the only activities of fission products come from the contaminated uranium ($6.26 \times 10^{-2}$ grams) on the fuel surface and that the volume of sampling chamber 20 is 1500 cm.$^3$, its effective sensitive volume 500 cm.$^3$, overall detection efficiency 5%, delay time 2 min., and the negative electrode 32 is polarized by a 5 kv. E.H.T. supply, the total counting rates (gammas greater than 2 mev.) are calculated as follows:

|  | Signal[1] ($\gamma$ sec.$^{-1}$) | Background[2] ($\gamma$ sec.$^{-1}$) |
|---|---|---|
| Example 1 | 18 | $1.69 \times 10^3$ |
| Example 2 | 18 | 362 |
| Example 3 | $1.2 \times 10^3$ | $1.52 \times 10^3$ |

[1] Number of gammas due to fission product isotope passing up the collimator for the first time.
[2] Activities due to recirculation and chamber wall contamination.

During irradiation, fission gas escapes from the fuel structure by a recoil process because when fission occurs within about 10$\mu$ of the surface of uranium, it is possible for a fission fragment to recoil free of the fuel. It is, therefore, approximately correct to say that a hole of 1 cm.$^2$ in the cladding is the equivalent of 18.6 mg. of exposed uranium in the core. Since the equivalent mass for 1 cm.$^2$ of exposed fuel calculated above only applies for gaseous fragments, it is necessary to use a fission fragment mean range of 12.6 mg./cm.$^2$ for calculation when all fission fragments are considered. From the above data, the mass of fuel pin contamination ($6.26 \times 10^{-2}$ g.) is the equivalent of 3.37 cm.$^2$ of exposed uranium for Examples 1 and 2 and 5 cm.$^2$ for Example 3.

Sensitivities of the various examples were calculated and are presented below:

| Measuring time (sec.) | Counting rate [1] (cps.) (>2 mev. gamma) | | | | | | |
|---|---|---|---|---|---|---|---|
| | Example 1 | | Example 2 | | Example 3 | | |
| | 10 | 60 | 10 | 60 | 1 | 10 | 60 |
| Exposed fuel area (cm.[2]): | | | | | | | |
| 1 | 5±18.5 | 5±7.55 | 5±8.75 | 5±3.57 | 240±75.3 | 240±23.8 | 240±9.42 |
| 2 | 11±18.5 | 11±7.56 | 11±8.76 | 11±3.58 | 480±77 | 480±24.35 | 480±9.92 |
| 3 | 16±18.55 | 16±7.57 | 16±8.8 | 16±3.6 | 720±78.5 | 720±24.8 | 720±10.2 |
| 5 | 26±18.56 | 27±7.59 | 27±8.85 | 27±3.62 | $1.2 \times 10^3 \pm 81.5$ | $1.2 \times 10^3 \pm 25.6$ | $1.2 \times 10^3 \pm 10.5$ |
| 10 | 54±18.65 | 54±7.6 | 54±9.02 | 54±3.68 | $2.4 \times 10^3 \pm 88.5$ | $2.4 \times 10^3 \pm 28$ | $2.4 \times 10^3 \pm 11.4$ |
| 20 | 107±18.8 | 107±9.3 | 107±9.3 | 107±3.8 | $4.8 \times 10^3 \pm 101$ | $4.8 \times 10^3 \pm 32$ | $4.8 \times 10^3 \pm 13.1$ |

[1] Only the signal counting rates with relative deviation are given.

The results of calculation on detection sensitivity indicate that it is important to have a polarizing electrode in the sampling chamber to avoid contamination of the chamber wall by active isotopes, and the systems of Example 2 and Example 3 are sensitive enough for small hole detection in the fuel cladding.

Thus, the present invention provides a highly efficient and inexpensive burst cartridge detection system for directly measuring the fission product activities in the coolant gas of a reactor. It should be understood, of course, that the invention in its broader aspects is not limited to the specific details as shown and described, and departures may be made from such details without departing from the principles of the invention and without sacrificing its chief advantages.

What is claimed is:

1. A detection system for use in a coolant gas circuit of a gas-cooled reactor for detecting predetermined types of radiation in said coolant gas, said detection system comprising:
    a first filter in fluid communication with said coolant gas circuit for removing particles larger than a predetermined size and spalled oxides from said coolant gas;
    a delay line in fluid communication with said first filter for delaying flow of the coolant gas;
    a second filter in fluid communication with said delay line;
    a pressure vessel having a sampling chamber containing no moving parts in fluid communication with said second filter;
    electrode means positioned within said chamber for preventing a build-up of daughter products within the chamber;
    a collimator located adjacent said chamber for receiving said predetermined types of radiation from said coolant gas within said chamber;
    means in operative relationship with said chamber via said collimator for detecting said predetermined types of radiation within the coolant gas; and
    means located adjacent to said collimator and between said chamber and said detecting means for passing a continuous flow of gas, substantially free of said predetermined types of radiation across said collimator.

2. A detection system as in claim 1 further including: shielding means located between said detecting means and said electrode means for inhibiting radiation from reaching said detecting means other than by said collimator.

3. A detection system as in claim 1 further including a power supply in circuit with said electrode means for negatively charging said electrode means whereby positive daughter products in said coolant gas are collected by the electrode means.

4. A detection system as in claim 1 wherein said predetermined types of radiation are gammas from fission products within the reactor.

5. A detection system as in claim 1 wherein said second filter includes:
    a plurality of negatively charged electrodes spaced apart along the primary direction of flow of said coolant gas; and
    a plurality of baffles spaced apart along the primary direction of flow of said coolant gas and alternately spaced between said electrodes.

6. A detection system as in claim 1 wherein said sampling chamber is substantially spherical in shape and wherein said electrode is substantially hemispherical in shape.

7. A detection system for use in a coolant gas circuit of a gas-cooled reactor for detecting predetermined types of radiation in said coolant gas, said detection system comprising:
    a pressure vessel having substantially spherically shaped sampling chamber containing no moving parts in fluid communication with said coolant gas circuit;
    substantially hemispherically shaped electrode means positioned within said chamber for preventing a build-up of a daughter products within the chamber;
    a collimator located adjacent said chamber for receiving said predetermined types of radiation from said coolant gas within said chamber;
    means in operative relationship with said chamber via said collimator for detecting said predetermined types of radiation within the coolant gas; and
    means located adjacent to said collimator and between said chamber and said detecting means for passing a continuous flow of gas, substantially free of said predetermined types of radiation across said collimator.

8. A detection system as in claim 7 further including shielding means located between said detecting means and said electrode means for inhibiting radiation from reaching said detecting means other than by said collimator.

9. A detection system as in claim 7 wherein said predetermined types of radiation are gammas from fission products within the reactor.

References Cited

UNITED STATES PATENTS

| | | | |
|---|---|---|---|
| 3,575,802 | 4/1971 | Gelius | 176—19 R |
| 3,376,200 | 4/1968 | Ward | 176—19 R |
| 2,998,519 | 8/1961 | Tunnicliffe et al. | 176—19 LD |
| 3,084,251 | 4/1963 | Goupil | 250—83.6 FT |
| 3,089,032 | 5/1963 | Goupil et al. | 250—83.6 FT |
| 3,174,041 | 3/1965 | Graftieaux et al. | 250—83.6 FT |
| 2,599,922 | 6/1952 | Kanne | 250—83.6 FT |

FOREIGN PATENTS

| | | | |
|---|---|---|---|
| 1,093,142 | 11/1967 | Great Britain | 176—19 LD |
| 1,269,633 | 10/1961 | France | 176—19 LD |

REUBEN EPSTEIN, Primary Examiner